United States Patent [19]
Merkin et al.

[11] Patent Number: 5,787,491
[45] Date of Patent: Jul. 28, 1998

[54] FAST METHOD AND APPARATUS FOR CREATING A PARTITION ON A HARD DISK DRIVE OF A COMPUTER SYSTEM AND INSTALLING SOFTWARE INTO THE NEW PARTITION

[75] Inventors: Stanley L. Merkin, Georgetown; Mukund P. Khatri; Robert B. Macy, both of Austin, all of Tex.

[73] Assignee: Dell USA LP, Austin, Tex.

[21] Appl. No.: 592,559

[22] Filed: Jan. 26, 1996

[51] Int. Cl.$^6$ ............................................. G06F 11/00
[52] U.S. Cl. ..................................... 711/173; 380/4
[58] Field of Search ........................... 395/497.04; 380/4

[56] References Cited

U.S. PATENT DOCUMENTS

| | | | |
|---|---|---|---|
| 5,007,082 | 4/1991 | Cummins | 380/4 |
| 5,128,995 | 7/1992 | Arnold et al. | 380/4 |
| 5,274,816 | 12/1993 | Oka | 395/700 |
| 5,509,120 | 4/1996 | Merkin et al. | 395/186 |
| 5,537,531 | 7/1996 | Suga et al. | 395/164 |
| 5,537,540 | 7/1996 | Müller et al. | 395/183.14 |
| 5,559,960 | 9/1996 | Lettvin | 395/186 |
| 5,586,327 | 12/1996 | Bealkowski et al. | 395/652 |
| 5,600,766 | 2/1997 | Deckys et al. | 395/135 |
| 5,604,906 | 2/1997 | Murphy et al. | 395/712 |

OTHER PUBLICATIONS

Mark Miinasi, "The Complete PC Upgrade and Maintenance Guide", Sybex, ISBN 0-89588-840-8, pp. 330-333 and 352, 1991.

*Primary Examiner*—Tod R. Swann
*Assistant Examiner*—Felix B. Lee
*Attorney, Agent, or Firm*—Arnold, White & Durkee

[57] ABSTRACT

A method and apparatus for creating a new partition in a hard disk drive of a computer system and installing software (e.g., system software) into the new partition. The method of the disclosed invention reads a diskette for a unique diskette signature which, if present, indicates that the diskette contains software to be installed in a new partition. If the unique diskette signature is found to be present on a diskette, then a new partition is created on the computer system's hard disk drive. The new partition can be of any size, and the size can, for example, be either fixed based upon predetermined settings or user-selected. After the new partition is created, it is assigned to logical drive 80$h$, the DOS boot drive. Once assigned to logical drive 80$h$, the invention boots to the diskette and the partition installation software contained on the diskette is executed. The installation software contained on the diskette then installs the software into the new partition.

13 Claims, 5 Drawing Sheets

FAST METHOD AND APPARATUS FOR CREATING A PARTITION ON A HARD DISK DRIVE OF A COMPUTER SYSTEM AND INSTALLING SOFTWARE INTO THE NEW PARTITION

BACKGROUND OF THE INVENTION

This invention relates to a fast method and apparatus for creating a partition on a hard disk drive of a computer system and installing software into the new partition. The invention advantageously permits a partition (e.g., a system partition or other protected partition) to be created and partition-specific software (e.g., utility software, system diagnosis or configuration software) to be installed on the hard disk drive of a computer system without requiring the computer system to be re-booted between creation of the partition and installation of the software. This invention provides a means for creating and installing a partition that is faster, more efficient, and more user-friendly.

Prior to the present invention, installing software into a newly-created hard disk drive partition typically required that a re-boot take place after the creation of the partition, and before the partition-specific software was installed in the partition. The process was completed in two parts. First, the partition was created by modifying the relevant tables associated with partitions, e.g., the partition table within the Master Boot Record (MBR), the File Allocation Table (FAT), and the Directory Table. Once the partition was created, an intervening re-boot was required to give utility installation software the ability to access the newly-created partition via standard operating system functions.

This prior known approach is rather inefficient and not user-friendly because of the intermediate re-booting step between partition creation and software installation. Therefore, what is needed is a fast method and apparatus for creating a partition on a hard disk of a computer system and installing software into the new partition without needing to perform an intervening re-boot.

SUMMARY OF THE INVENTION

The present invention solves the above-noted problems by providing a method and apparatus for creating a new partition on a hard disk drive of a computer system and installing software into the new partition without requiring an intermediate re-booting step.

In particular, the disclosed invention contemplates modifying the Power On Self Test (POST) program residing in a computer system's BIOS memory to read a diskette in the computer system's diskette drive for the presence of a unique diskette signature. If this unique diskette signature is present, this indicates that the diskette contains software to be installed in a new partition. Whenever this unique diskette signature is present on a diskette, a new partition is created on the computer system's hard disk drive. The new partition can be of any size, and the size of a new partition created via the method of this disclosure can be established in a variety of ways, including using predetermined sizes "hard-coded" into the POST program, or using sizes based upon user selection. After the new partition is created, it is assigned to logical drive 80*h*—the DOS boot drive. Once the new partition is assigned to logical drive 80*h*, the method of the present invention contemplates booting to the diskette, whereupon partition installation software contained on the diskette is executed. Execution of the installation software contained on the diskette installs the software into the new partition.

Also contemplated as part of the present invention is a program storage device, for example, a BIOS memory, tangibly embodying a set of instructions that, when loaded into a computer system (e.g., a personal computer (PC)), will cause the computer system to perform the above-described method. The invention also encompasses a programmed computer system that will perform the method steps described above.

These and other features and advantages of the present invention will become apparent to those of ordinary skill in this art with reference to the appended drawings and following detailed description.

DETAILED DESCRIPTION OF SPECIFIC EMBODIMENTS

One implementation of the invention is described herein for purposes of illustration, namely a machine-executed method and apparatus for creating a new partition in a hard disk drive of a computer system and installing software into the new partition without requiring an intermediate re-booting step. The machine-executed method is initiated upon discovering a unique "signature" on a diskette inserted in a computer system's disk drive. This unique signature indicates that the diskette is an installation diskette containing software to be installed in a new partition to be created on a computer system's hard disk drive. The method of the present invention is performed by executable computer software contained in Basic Input/Output System (BIOS) firmware stored in ROM, flash memory or the like. BIOS is the firmware in a PC that interfaces directly with the hardware to perform input/output and other low-level functions. An actual implementation of such computer code might be executable on an Intel 80×86-based or Pentium™-based computer system, or on other suitable processor-based computer systems.

It will be appreciated by those of ordinary skill, of course, that references to the performance of method steps by computer software actually mean that a computer, or one of its components, is performing the method steps in response to the instructions encoded in the computer software.

It will, of course, be appreciated that in the development of any such actual implementation (as in any hardware or software development project), numerous design and programming decisions must be made to achieve the developers' specific goals and subgoals (e.g., compliance with system-related and business-related constraints), which will vary from one implementation to another. Moreover, attention will necessarily be paid to, e.g., proper serialization to handle concurrent events. It will be appreciated that a development effort of this type might be complex and time-consuming, but would nevertheless be a routine undertaking of computer system design and development for those of ordinary skill having the benefit of this disclosure.

Figure 1:
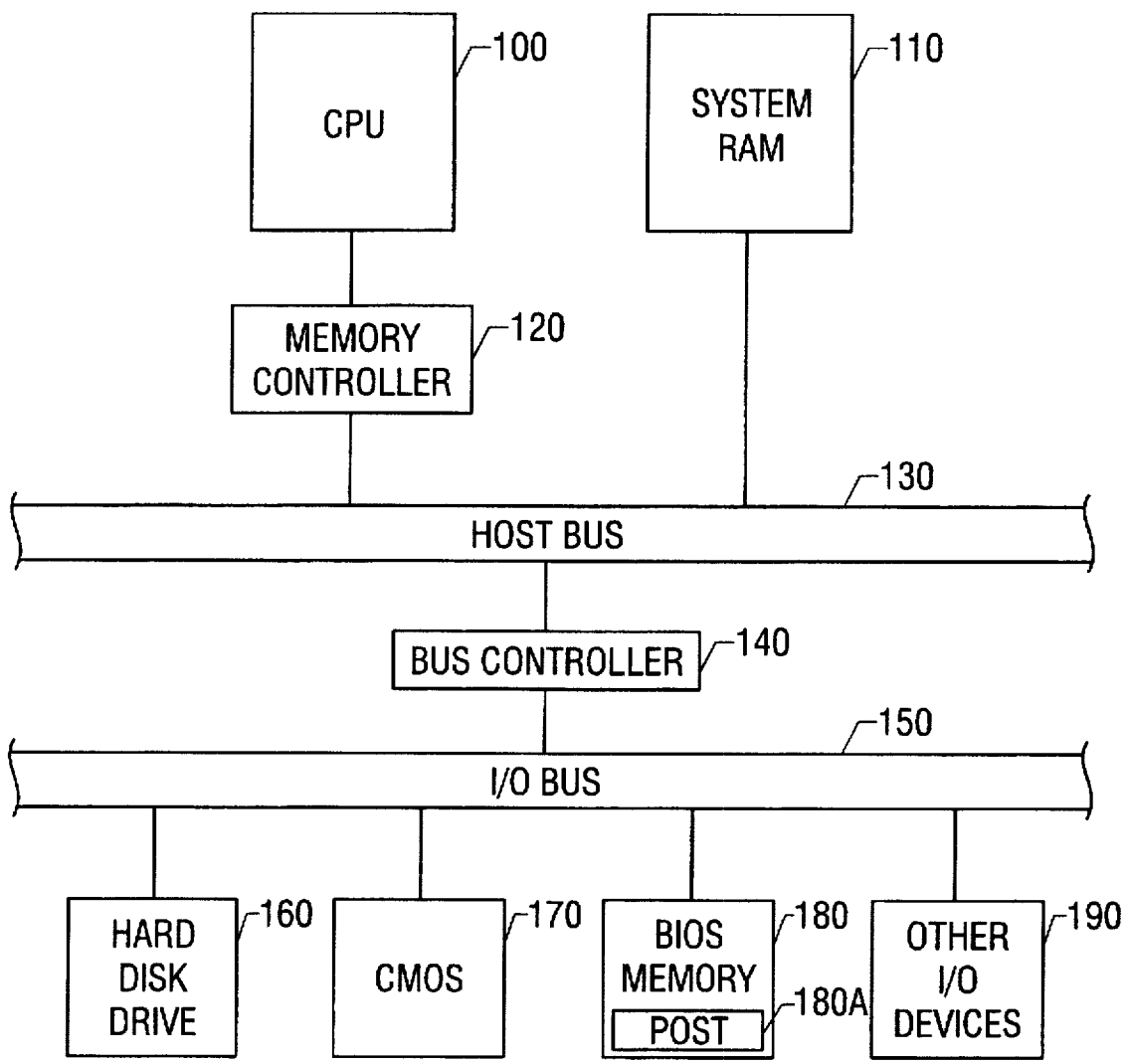
FIG. 1 is a block diagram view of a computer system for implementing the method of the present invention.

Depicted in FIG. 1 is a computer system in which a method of the present invention may be implemented. In most instances, those elements of a computer system not necessary to understand the operation of the present invention have been omitted for simplicity. In other instances, however, certain elements of a computer system not necessary to understand the present invention have nevertheless been included to provide a more complete overview of the entire computer system in which the method of the present invention might be performed.

The computer system includes a CPU 100 connected to system RAM 110 via a memory controller 120 and host bus 130. CPU 100 is further connected to other hardware devices via host bus 130, bus controller 140, and I/O bus 150. These other hardware devices include, for example, hard disk drive 160, a nonvolatile storage device, such as CMOS 170, BIOS memory 180 in which a POST program 180A is stored, as well as other I/O devices, including, for example, a keyboard, display, mouse, joystick, or the like, all of which are collectively designated by reference numeral 190.

The method of the present invention contemplates modifying the computer system's POST program 180A to include additional steps for creating a new partition on hard disk drive 160 and installing software into this new partition without requiring a re-boot to allow the computer's operating system software to have access to the new partition. During the execution of POST program 180A, a query is made to recognize the presence of a uniquely-coded diskette in diskette drive 190. The presence of this unique coding, or "signature," indicates that the diskette contains software (e.g., system software, diagnostic and configuration utility software) that is to be loaded into a new hard disk drive partition (e.g., a protected system partition). Upon encountering a diskette bearing the unique signature, the POST program 180A responds by creating and/or modifying one or more new partition table entries, FAT, and Directory Table entries for the new partition.

Because hard disk drive partitions may vary in size, the method of the present invention contemplates that the new partition may be of any allowable size, and that the method for determining the partition size can be implemented in many possible ways. For example, the present invention might be implemented to allow the user to specify the desired size of the new partition, to allow the user to select from one or more predetermined sizes included in the POST program 180A, or to create the size of the partition based upon assumptions "hard-coded" into the POST program 180A.

Once all appropriate table entries are created and/or modified for creating the new partition, the POST program 180A causes the new partition to be visible to the operating system by defining the partition as boot drive 80h. After the partition is defined as drive 80h, POST permits the computer system to continue booting the floppy and to execute the software installation code residing on the signature diskette. The software to be installed can then be copied into the new partition without requiring a re-boot between the creation of the partition and the subsequent software installation.

Figure 2:
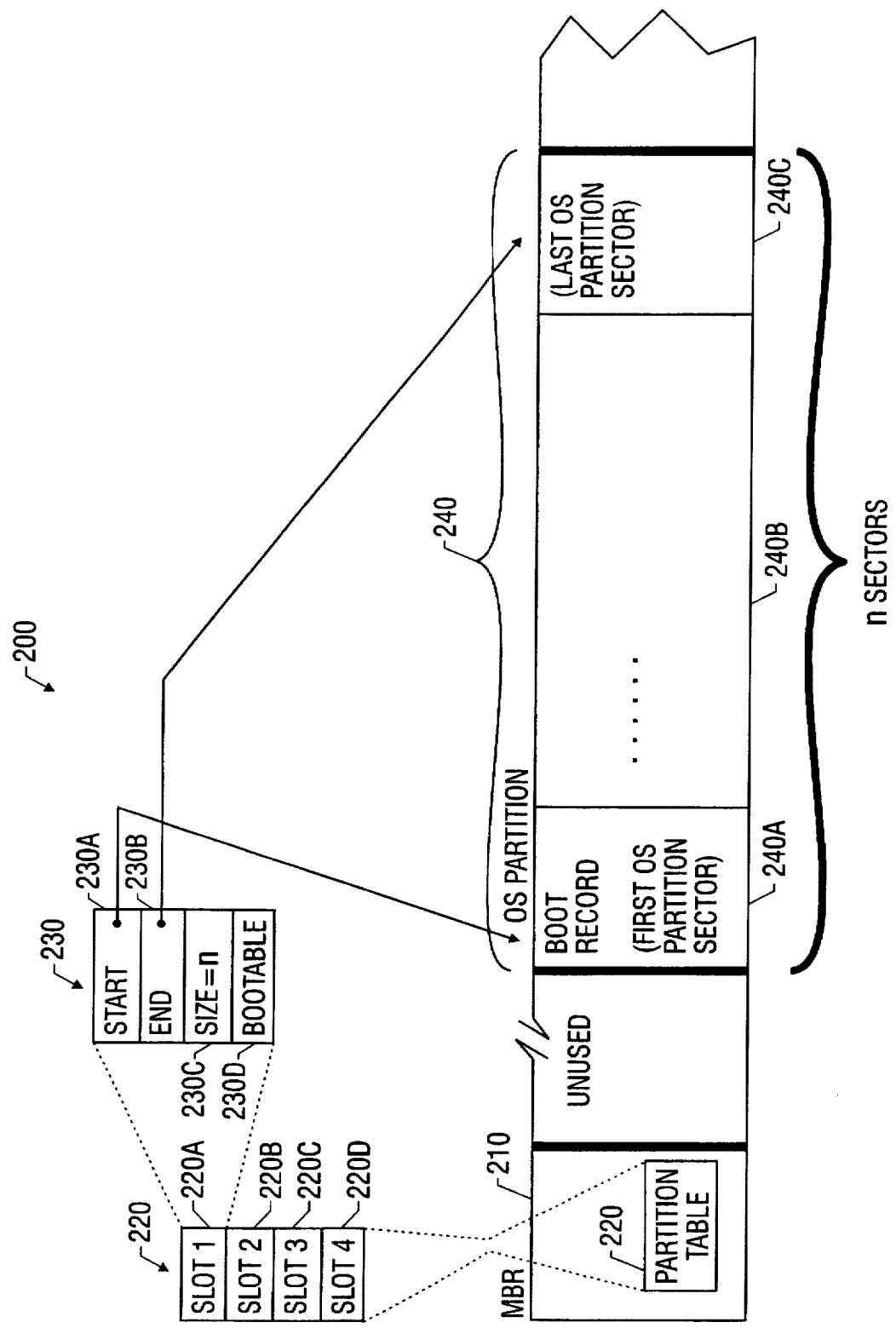
FIG. 2 is a block diagram view of the typical organization of a Master Boot Record, partition table, and operating system partition residing on a computer system's hard disk drive.

Referring now to FIG. 2, presented is a block diagram view of the typical organization of the MBR, partition table, and a partition residing on a computer system's hard disk drive 160 (FIG. 1). A hard disk drive 160 (FIG. 1) typically consists of a stack of magnetic platters, each platter having two surfaces used to store data. Each platter surface is divided into a plurality of concentric circles known as tracks. All tracks of equal diameter are grouped together to form a cylinder. The outermost group of tracks on each platter forms cylinder 0, the second-outermost group forms cylinder 1, and so on. Each track is further subdivided into smaller parcels, called sectors, into which data is typically written and from which data is typically read. Before a hard disk drive 160 (FIG. 1) can be used, multiple sectors from one or more contiguous cylinders must be grouped together to form partitions. Each partition is often dedicated to and contains a particular operating system, but this is not always the case. A partition might also be defined as a data partition, i.e., a partition which contains no operating system code, but which has a file system and file structure to provide access by one or more operating systems. In other words, a hard disk drive 160 (FIG. 1) can have one or more operating systems, each typically residing in its own partition; for each partition there is typically only one operating system that can store files in that partition. However, persons skilled in the art will readily recognize that a partition could contain a file system and file structure that is compatible with more than one operating system, e.g., both the DOS and OS/2 operating systems can read and write files to a FAT partition.

Residing on hard disk drive 160 (FIG. 1) is MBR 210. MBR 210 is typically not accessed by general software applications, but is instead updated only by special system utilities. For purposes of the present invention, it is important to recognize that the MBR 210 is updated whenever a partition is added or deleted. Persons skilled in the art will, of course, be aware of other significant aspects of MBR 210.

Contained within MBR 210 is partition table 220. Each of a computer system's hard disk drives 160 (FIG. 1) maintains a partition table 220. In the disclosed exemplary embodiment, partition table 220 contains four "slots" 220A–D. Each of slots 220A–D contains information concerning a single hard disk drive partition. START field 230A contains a pointer to the first sector of a particular partition 240A. END field 230B contains a pointer to the last sector of the same partition 240C. SIZE field 230C contains the number of sectors in the same partition. BOOTABLE field 230D contains a flag indicating whether or not the same partition is bootable.

Figure 3A:
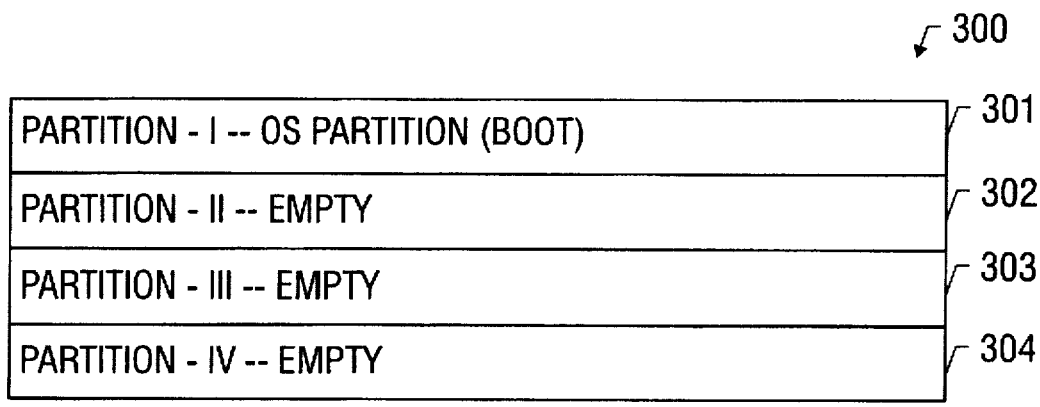
FIG. 3 is a block diagram view depicting three different states of the partition table that occur during the partition install process disclosed in the method of the present invention.
Figure 3B:
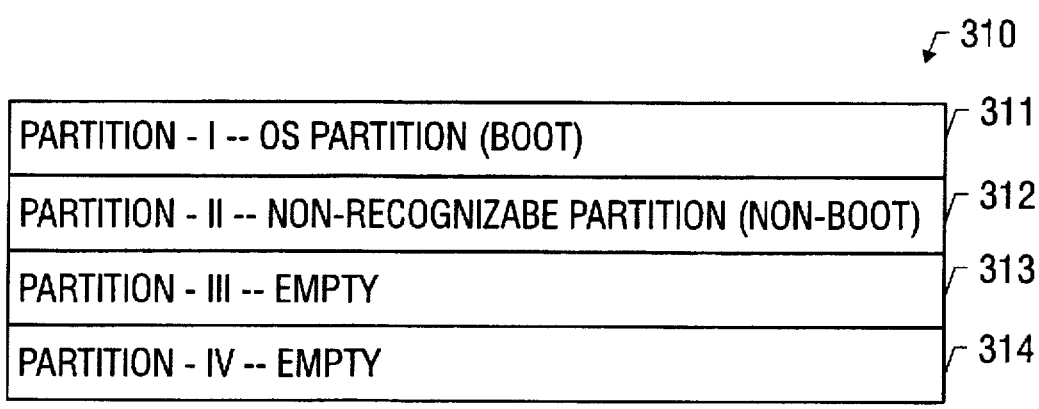
Figure 3C:
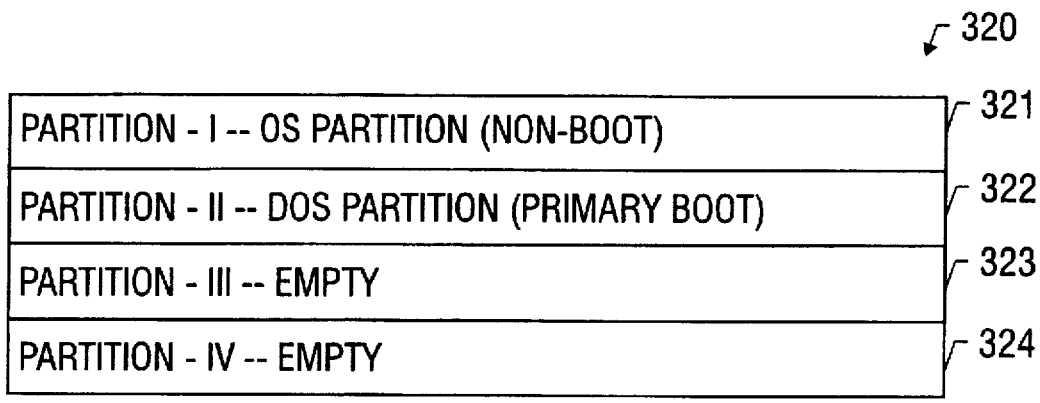

Referring now to FIG. 3, presented is a more detailed block diagram depicting three different states of the partition table 220 (FIG. 2) that occur during the partition creation and software install process disclosed in the method of the present invention. The first state 300 depicts the status of the partition table 220 (FIG. 2) before the execution of the POST program in accordance with the present invention. Prior to POST program execution, first state 300 depicts only a single partition 301 dedicated to the computer system's operating system. The three remaining partition table slots 302–304 are empty in this example.

The second partition table state 310 depicts the status of the partition table 220 (FIG. 2) after the execution of the POST program as modified in accordance with the present invention. Under the disclosed method, a new partition of unknown type is created as a second partition 312. The first partition 311 continues to be a bootable partition dedicated to the computer system's operating system. The two remaining partition table slots 313–314 are empty in this example.

The third partition table state 320 depicts the status of the partition table 220 (FIG. 2) at initial program load (IPL). At IPL, the disclosed method has assigned the new partition to be bootable drive 80h. With the new partition defined as drive 80h, the newly-created partition 322 is now visible to DOS. Therefore, the installation code contained on the "signature" diskette can execute, causing the files contained on the "signature" diskette to be copied into the new partition 322. The first partition 321 remains defined within the partition table 220 (FIG. 2), but is now a non-bootable partition. The two remaining partition table slots 323-324 are empty in this example.

Figure 4:
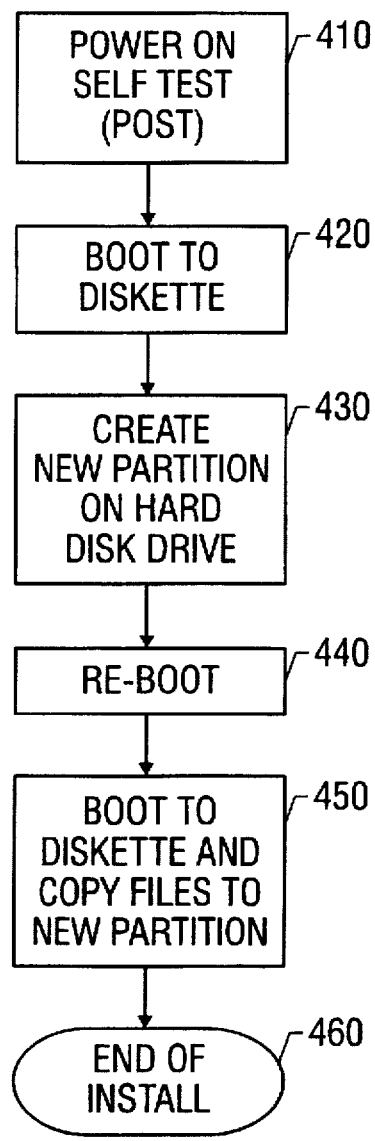
FIG. 4 is a flowchart representing a sequence of steps performed in the prior art to create a new partition and to install software in the newly-created partition.

Referring now to FIG. 4, depicted is a flowchart representing a sequence of steps performed in the prior art to create a new partition and to install software in the newly-created partition. Under the prior known methods of installing software into a newly-created partition, a computer system re-boot was required after the new partition was created. This re-boot was necessary to allow the operating system, e.g., MS-DOS, to obtain access to the new partition.

At step 410, the POST program is executed at computer system start-up. The POST program execution proceeds to its conclusion.

Following execution of the POST program, at step 420: software contained in the computer system's BIOS memory is executed. The presence of a diskette is detected in the computer system's boot drive, and the system boots from this diskette.

Step 430: Installation software residing on the diskette is executed, causing the new partition to be created on the hard disk drive. However, the operating system software cannot access the new partition until the computer system is re-booted, whereupon the new partition will be visible to the operating system and accessible by the installation software.

At step 440, the computer system is re-booted. After the computer system is re-booted, the new partition is now visible to the operating system.

Step 450: The computer system boots to the diskette in the diskette drive. As already observed, this diskette contains installation software for copying files into the new partition.

Step 460: The installation of the software into the newly-created partition is complete.

Figure 5:
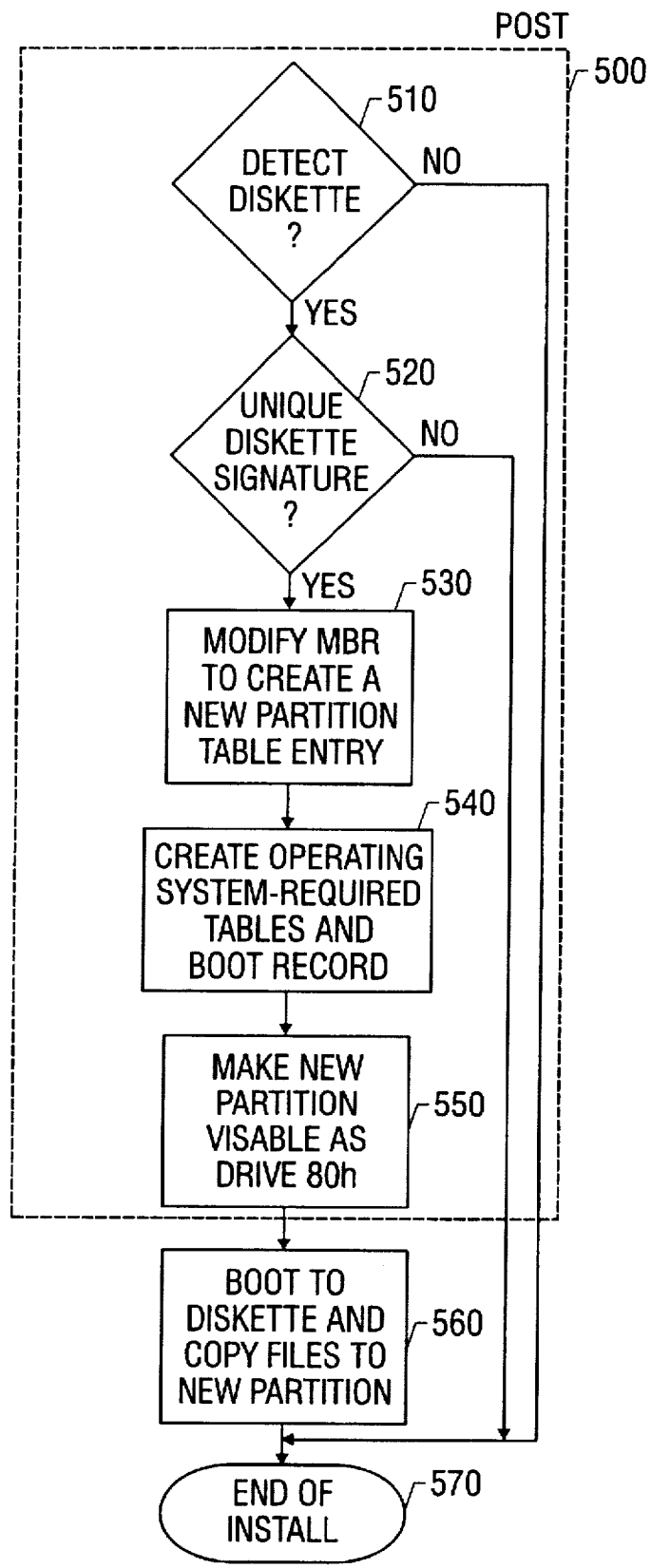
FIG. 5 is a flowchart representing a sequence of steps performed in accordance with the present invention.

Referring now to FIG. 5, depicted is a flowchart representing a sequence of steps performed in accordance with the present invention. Unlike the known methods of the prior art, the method of the present invention allows a new partition to be created and software to be installed into that new partition without requiring the intermediate re-booting step. Because this new method eliminates the re-booting step, the installation of software into a dedicated, newly-created partition is faster, more efficient and user-friendly.

Step 500 collectively refers to steps 510-550, inclusive, and represents steps that occur during execution of the POST program, as modified in accordance with the method of the present invention.

At step 510, the computer system's disk drive is queried for the presence of a diskette. If no diskette is detected, control passes to step 570 where the special partition installation process is terminated. However, if a diskette is detected, control passes to step 520.

Step 520: The detected diskette is queried for the presence of a unique diskette signature. If this unique diskette signature is present, this indicates that the diskette is a special installation diskette requiring the creation of a new partition, and control passes to step 530. If the unique diskette signature is not present, control passes to step 570 where the special partition installation process is terminated.

At step 530, the MBR—in particular the partition table—is modified to create a new partition entry. In this exemplary embodiment the size of the new partition is "hard-coded" into the POST program. However, as has been discussed previously, the size of the new partition can be handled in any of several approaches, including the user selecting the desired partition size, or the installation code contained on the special installation diskette providing the target partition size.

At step 540, operating system-required tables (e.g., the FAT and directory table) and boot record are created for the new partition.

Step 550: The newly-created partition is assigned as drive 80h, the bootable drive. Once assigned as drive 80h, the newly-created partition is accessible by the operating system. Access to the new partition by the operating system is necessary for files to be copied into the new partition during software installation.

At step 560, the POST program has terminated and the computer system boots to the special installation diskette. Installation software contained on the special installation diskette uses the operating system functions now available to copy files into the new partition.

Step 570: The partition creation and installation process is completed.

Although the exemplary embodiment focuses on the creation of a system partition for use by dedicated system utility software, it will be readily recognized by those of skill in the relevant art that the inventive concept taught could easily be extended to any application in which one wishes to install software into a new hard disk partition. For example, the method of the present invention could easily be adapted to create a partition into which an operating system is installed in a single, user-friendly step.

Those of ordinary skill in the art will further recognize that, in the context of this disclosure, there are many alternative implementations to create a partition and install software into the new partition without requiring an intermediate re-boot step. Therefore, it will be appreciated by those of ordinary skill, having the benefit of this disclosure, that numerous variations from the foregoing illustration will be possible without departing from the inventive concept described therein. Accordingly, it is the claims set forth below, and not merely the foregoing illustrations, which are intended to define the exclusive rights claimed in the application.

What is claimed is:

1. A machine-executed method for creating a new partition in a hard disk drive of a computer system, said method comprising:
   (a) reading a diskette during POST contained in a diskette drive of said computer system for detecting the presence of a unique diskette signature on said diskette; and
   (b) if said unique diskette signature is found to be present on said diskette,
      (i) creating said new partition on said hard disk drive during POST; and
      (ii) modifying a master boot record associated with said hard disk drive during POST so that said partition can be immediately recognized by an operating system without the need for an intervening reboot.

2. The method of claim 1, wherein said new partition on said hard disk drive is of a predetermined size.

3. The method of claim 1, wherein said new partition on said hard disk drive is of a size selected by a user of said computer system.

4. The method of claim 1, said creating said partition step comprising:

(a) modifying partition table entries in a master boot record associated with said hard disk drive during POST to include information necessary to enable an operating system running on said computer system to recognize and access said new partition during a subsequent initial program load;

(b) modifying file allocation table entries associated with said hard disk drive during POST to include information necessary to enable an operating system running on said computer system to recognize and access said new partition during said subsequent initial program load; and (c) modifying directory table entries associated with said hard disk drive during POST to include information necessary to enable an operating system running on said computer system to recognize and access said new partition during said subsequent initial program load.

5. The method of claim 1, wherein said new partition on said hard disk drive is a system partition.

6. The method of claim 1, said modifying master boot record step comprising assigning said new partition to logical drive 80h.

7. A machine-executed method for creating a new partition in a hard disk drive of a computer system and installing partition-specific software into said new partition, said method comprising:

(a) reading a diskette during POST contained in a diskette drive of said computer system for detecting the presence of a unique diskette signature on said diskette;

(b) if said unique diskette signature is found to be present on said diskette, performing the following additional steps:

(i) creating said new partition during POST on said hard disk drive;

(ii) assigning said new partition during POST to logical drive 80h;

(iii) booting to said diskette; and (iv) executing partition installation software contained on said diskette having said unique diskette signature, said execution of said installation software causing said partition-specific software to be installed into said new partition.

8. The method of claim 7, where in said new partition on said hard disk drive is of a predetermined size.

9. The method of claim 7, wherein said new partition on said hard disk drive is of a size selected by a user of said computer system.

10. The method of claim 7, said creating said partition step comprising:

(a) modifying partition table entries in a master boot record associated with said hard disk drive during POST to include information necessary to enable an operating system running on said computer system to recognize and access said new partition during a subsequent initial program load;

(b) modifying file allocation table entries associated with said hard disk drive during POST to include information necessary to enable an operating system running on said computer system to recognize and access said new partition during said subsequent initial program load; and (c) modifying directory table entries associated with said hard disk drive during POST to include information necessary to enable an operating system running on said computer system to recognize and access said new partition during said subsequent initial program load.

11. The method of claim 7, wherein said new partition on said hard disk drive is a system partition.

12. The method of claim 7, wherein said partition-specific software is system utility software.

13. A program storage device readable by a machine and encoding a program of instructions which, when read by the machine causes the machine to perform the method of any one of claims 1, 3–7, 8–12 and 6.

* * * * *